United States Patent [19]

Okada et al.

[11] Patent Number: 4,712,877
[45] Date of Patent: Dec. 15, 1987

[54] FERROELECTRIC DISPLAY PANEL OF VARYING THICKNESS AND DRIVING METHOD THEREFOR

[75] Inventors: Shinjiro Okada, Kawasaki; Junichiro Kanbe, Yokohama; Akira Tsuboyama, Tokyo; Yutaka Inaba, Kawaguchi, all of Japan

[73] Assignee: Canon Kabushiki Kaisha, Tokyo, Japan

[21] Appl. No.: 819,070

[22] Filed: Jan. 15, 1986

[30] Foreign Application Priority Data

Jan. 18, 1985 [JP] Japan .................................. 60-5847
Dec. 20, 1985 [JP] Japan .................................. 60-287108

[51] Int. Cl.$^4$ .............................................. G02F 1/13
[52] U.S. Cl. ................................ 350/350 S; 350/333; 350/334; 350/336
[58] Field of Search ............... 350/333, 334, 350 S, 350/336

[56] References Cited

U.S. PATENT DOCUMENTS 4,264,149  4/1981  De Zwart et al. ............. 350/334 X
4,641,922  2/1987  Jacob ............................ 350/334 X

FOREIGN PATENT DOCUMENTS 60-184227  9/1985  Japan ......................... 350/350 S

OTHER PUBLICATIONS

Clark, N. A. et al., "Submicrosecond Bistable Electrooptic Switching in Liquid Crystals", *Appl. Phys. Lett.*, vol. 36, No. 11, Jun. 1980, pp. 899–901.

Primary Examiner—Stanley D. Miller
Assistant Examiner—Richard F. Gallivan
Attorney, Agent, or Firm—Fitzpatrick, Cella, Harper & Scinto

[57] ABSTRACT

A driving method for a liquid crystal device of the type comprising a picture element formed by a first electrode, a second electrode oppositely spaced from the first electrode, and a ferroelectric liquid crystal disposed at the opposite portion between the first and second electrodes and having a varying layer thickness. The driving method comprises: a first step of applying a voltage signal between the first and second electrodes for orienting a region extending over the whole area of the picture element to either one of a first and a second state, and a second step of applying a pulse with a waveform corresponding to gradation information between the first and second electrodes to switch the state of a region defining a prescribed area of the picture element from one state resultant in the first step to the other state.

41 Claims, 34 Drawing Figures

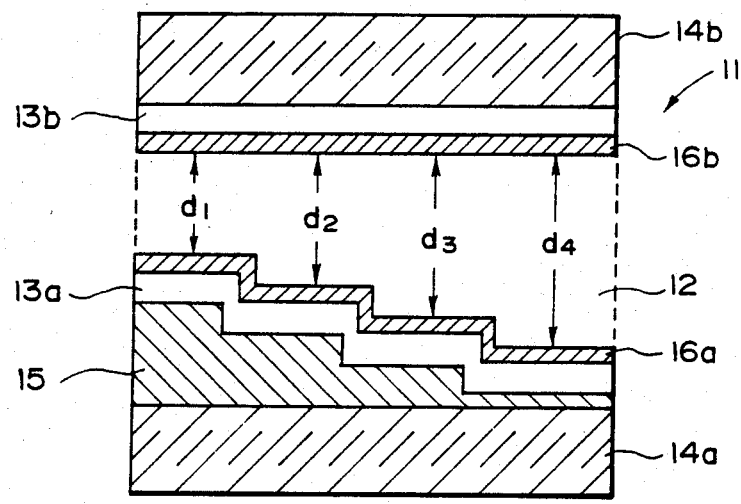
F I G. 1
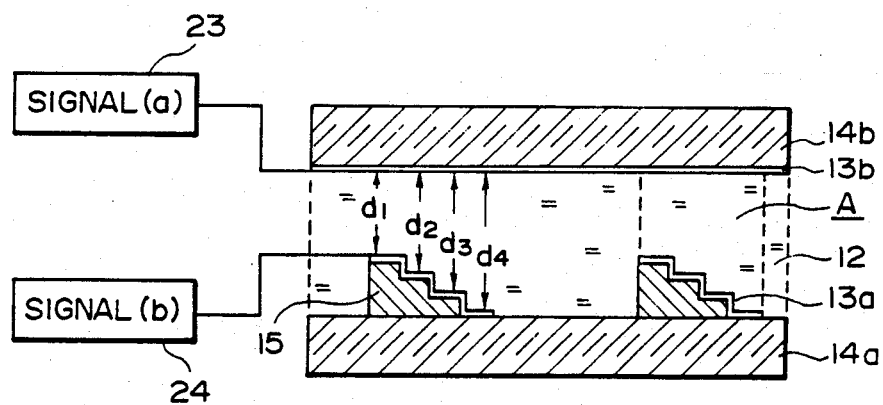
F I G. 2

(a)

(b)

(c)

(d)

(e)

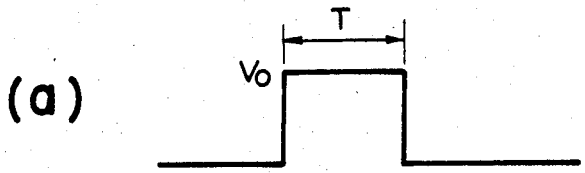
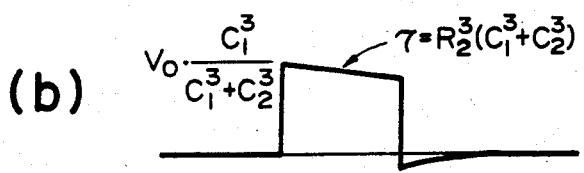
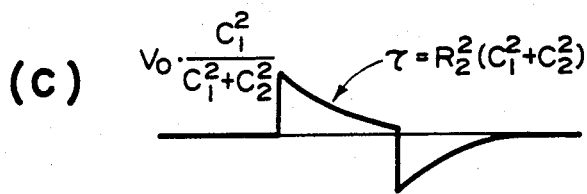
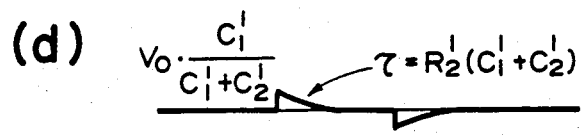
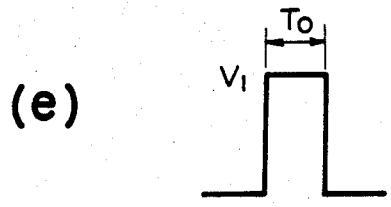
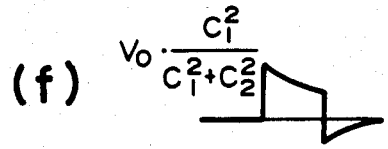
F I G. 11

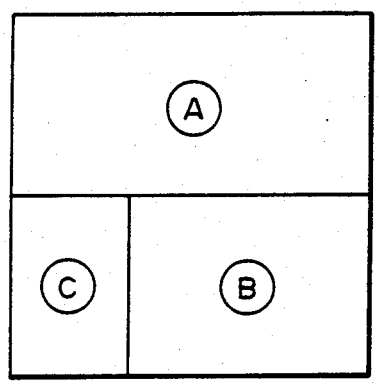
A : B : C = 3 : 2 : 1
F I G. 13(A)
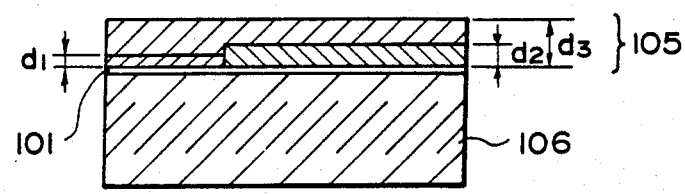
F I G. 13(B)

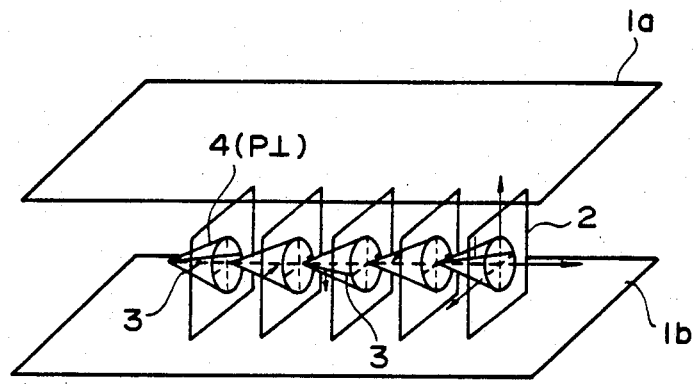
F I G. 14
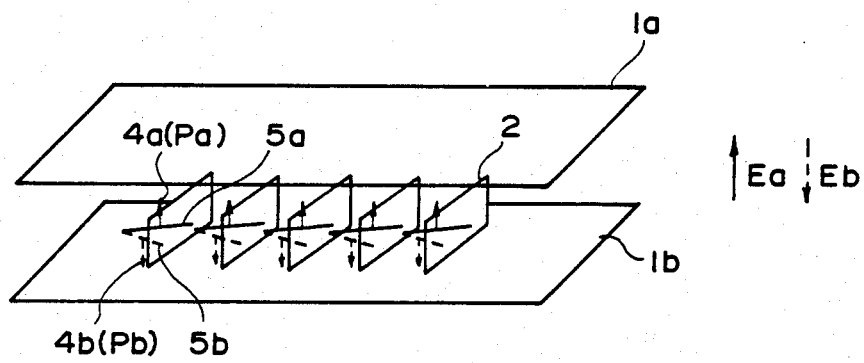
F I G. 15

FERROELECTRIC DISPLAY PANEL OF VARYING THICKNESS AND DRIVING METHOD THEREFOR

FIELD OF THE INVENTION AND RELATED ART

The present invention relates to a ferroelectric liquid crystal device adapted for a gradational or tonal display using an area gradation expression system, and a method for driving the same. More particularly, the present invention relates to a liquid crystal television panel using a ferroelectric liquid crystal having at least two stable states and a gradational display method therefor.

In the conventional liquid crystal television panel of the active matrix driving system, thin film transistors (TFTs) are arranged in a matrix corresponding to respective picture elements. When a gate-on pulse is applied to a TFT to turn on the source-drain channel, a picture image signal is applied to the source and stored in a capacitor. A liquid crystal (e.g., TN (twisted nematic) liquid crystal) is driven by the stored image signal and a gradational display is effected by voltage modulation of the picture elements.

However, such a television display panel of the active matrix driving system using a TN liquid crystal has complicated structure of TFTs requiring a large number of production steps and a corresponding high production cost. Moreover, it is difficult to provide a large semiconductor film area (e.g., of polysilicon, amorphous silicon) constituting TFTs.

On the other hand, a display panel of a passive matrix driving type using a TN liquid crystal has a low production cost. However, in this type of liquid crystal display panel, when the number (N) of scanning lines is increased, a time period (duty factor) during which one selected point is subjected to an effective electric field during the time when one frame is scanned is decreased at a ratio of 1/N, whereby crosstalk occurs and a picture with a high contrast cannot be obtained. Furthermore, as the duty factor is decreased, it is difficult to control gradation of respective picture elements by means of voltage modulation so that this type of display is not adapted for a display panel having a high picture element or wiring density, particularly a liquid crystal television panel.

In order to solve the above-mentioned problems of the TN type liquid crystal, Clark and Lagerwall have proposed a ferroelectric liquid crystal device showing bistability as shown in U.S. Pat. No. 4,367,924.

However, the image display system utilizing the ferroelectric liquid crystal has been considered inappropriate for gradational display, because when ferroelectric liquid crystal molecules are placed in a state showing a memory characteristic, they tend to be stabilized at either one of two states in the bistability condition and do not show an intermediate molecular state, at least ideally, thus failing to show a continuously changing molecular behavior (analog behavior) as observed in a conventional liquid crystal. If a dither method is adopted for gradational display on that account, the resulting lower resolving power fails to provide the required display quality. Particularly, the dither method is not appropriate in a case where electrodes are formed by etching, because the size of one picture element is restricted.

SUMMARY OF THE INVENTION

A principal object of the present invention is, in view of the above-mentioned problems of the prior art, to provide a liquid crystal device for gradational display in a display panel with a high density of picture elements over a relatively wide area, particularly in a liquid crystal television panel.

The term "gradational display" used herein means a display of a picture with a gradation i.e., a picture with gradual or stepwise change in tones or shades or with more than two distinguishable tones or shades including a half tone.

According to a broad aspect of the present invention, there is provided a liquid crystal device comprising: a pair of oppositely spaced electrodes, and a ferroelectric liquid crystal layer disposed between the pair of oppositely spaced electrodes and having varying thicknesses. According to another aspect of the present invention, there is provided a driving method for a liquid crystal device as described above, which method comprises applying a voltage signal corresponding to gradation information between the pair of oppositely spaced electrodes.

These and other objects, features and advantages of the present invention will become more apparent upon consideration of the following description of the preferred embodiments of the present invention taken in conjunction with the accompanying drawings, wherein like reference numerals denote like parts or members.

BRIEF DESCRIPTION OF THE DRAWINGS

FIG. 1 is a sectional view of an embodiment of the liquid crystal device according to the invention;

FIG. 2 is an explanatory view of a specific embodiment of the liquid crystal device according to the invention;

FIGS. 11(a)–(e) show waveforms of rectangular pulses applied between electrodes and effective voltages applied to a liquid crystal layer;

FIGS. 14 and 15 are schematic perspective views for illustrating the operational principle of a ferroelectric liquid crystal device used in the invention.

DESCRIPTION OF THE PREFERRED EMBODIMENTS

Figure 3:
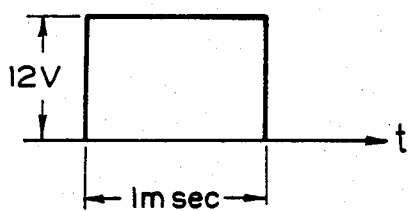
FIG. 3 and FIGS. 4(a)–(e) show a scanning selection signal and gradation signals, respectively, used in an embodiment of the driving method according to the invention.

As an optical modulation material used in the driving method according to the present invention, a material which shows either a first optically stable state or a second optically stable state depending upon an electric field applied thereto, i.e., has bistability with respect to the applied electric field, particularly a liquid crystal having the above-mentioned property, may be used.

Preferable ferroelectric liquid crystals having bistability which can be used in the driving method according to the present invention are chiral smectic liquid crystals having ferroelectricity, among which chiral smectic C (SmC*)- or (SmH*)-phase liquid crystals are suitable. These ferroelectric liquid crystals are described in, e.g., "LE JOURNAL DE PHYSIQUE LETTERS" 36 (L-69), 1975 "Ferroelectric Liquid Crystals"; "*Applied Physics Letters*" 36 (11) 1980, "Submicro Second Bistable Electrooptic Switching in Liquid Crystals", "Kotai Butsuri (*Solid State Physics*)" 16 (141), 1981 "Liquid Crystal", etc. Ferroelectric liquid crystals disclosed in these publications may be used in the present invention.

More particularly, examples of ferroelectric liquid crystal compounds usable in the method according to the present invention include decyloxybenzylidene-p'-amino-2-methylbutyl cinnamate (DOBAMBC), hexyloxybenzylidene-p'-amino-2-chloropropyl cinnamate (HOBACPC), 4-o-(2-methyl)-butylresorcylidene-4'-octylaniline (MBRA 8), etc.

When a device is constituted using these materials, the device may be supported with a block of copper, etc., in which a heater is embedded in order to realize a temperature condition where the liquid crystal compounds assume a chiral smectic C- or H-phase (SmC* or SmH*).

In the present invention, ferroelectric liquid crystals showing a chiral smectic I phase (SmI*), J phase (SmJ*), G phase (SmG*), F phase (SmF*) or K phase (SmK*) may also be used in addition to the above-mentioned SmC* or SmH* phase.

Further, the present invention can be applicable to a chiral smectic liquid crystal in addition to the above-mentioned bistable chiral smectic liquid cystals.

Referring to FIG. 14, there is schematically shown an example of a ferroelectric liquid crystal cell for explanation of the operation thereof. Reference numerals 1a and 1b denote base plates (glass plates) on which a transparent electrode of, e.g., $In_2O_3$, $SnO_2$, ITO (Indium-Tin Oxide), etc., is disposed, respectively. A liquid crystal of, e.g., an SmC*-phase in which liquid crystal molecular layers 2 are oriented perpendicular to the surfaces of the glass plates is hermetically disposed therebetween. Full lines 3 show liquid crystal molecules. Each liquid crystal molecule 3 has a dipole moment ($P_\perp$) 4 in a direction perpendicular to the axis thereof. When a voltage higher than a certain threshold level is applied between electrodes formed on the base plates 1a and 1b, a helical structure of the liquid crystal molecule 3 is loosened or unwound to change the alignment direction of respective liquid crystal molecules 3 so that the dipole moments ($P_\perp$) 4 are all directed in the direction of the electric field. The liquid crystal molecules 3 have an elongated shape and show refractive anisotropy between the long axis and the short axis thereof. Accordingly, it is easily understood that when, for instance, polarizes arranged in a cross nicol relationship, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device, of which optical characteristics vary depending upon the polarity of an applied voltage. Further, when the thickness of the liquid crystal cell is sufficiently thin (e.g., 1 $\mu$), the helical structure of the liquid crystal molecules is loosened even in the absence of an electric field whereby the dipole moment assumes either of the two states, i.e., Pa in an upper direction 4a or Pb in a lower direction 4b as shown in FIG. 15. When electric field Ea or Eb higher than a certain threshold level and different from each other in polarity as shown in FIG. 15 is applied to a cell having the above-mentioned characteristics, the dipole moment is directed either in the upper direction 4a or in the lower direction 4b depending on the vector of the electric field Ea or Eb. In correspondence with this, the liquid crystal molecules are oriented in either of a first stable state 5a or a second stable state 5b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 15. When the electric field Ea is applied to the liquid crystal molecules, they are oriented in the first stable state 5a. This state is kept stable even if the electric field is removed. On the other hand, when the electric field Eb of which direction is opposite to that of the electric field Ea is applied thereto, the liquid crystal molecules are oriented to the second stable state 5a, whereby the directions of molecules are changed. This state is also kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 $\mu$, particularly 1 to 5 $\mu$. A liquid crystal-electrooptical device having a matrix electrode structure in which the ferroelectric liquid crystal of this kind is used is proposed, e.g., in the specification of U.S. Pat. No. 4,367,924 by Clark and Lagerwall.

The present invention is characterized by a specific cell structure to be used in combination with a ferroelectric liquid crystal showing at least two stable states, particularly a ferroelectric liquid crystal placed under a state showing the above-mentioned bistability. More specifically, the layer thickness of the ferroelectric liquid crystal is changed continuously or stepwise and the spacing between the opposite electrodes is also changed continuously or stepwise corresponding to the change in the layer thickness, thereby to provide desired gradational display.

As previously described, in the ferroelectric liquid crystal device showing the bistability, the orientation directions of the liquid crystal molecules are switched by applying two different polarities of electric field whereby optical modulation can be effected.

In the present invention, the ferroelectric liquid crystal device may generally be driven by applying rectangular pulses to a liquid crystal layer through a pair of electrodes. A ferroelectric liquid crystal has a steep threshold characteristic in response to an electric field given by rectangular pulses. More specifically, the ferroelectric liquid crystal molecules do not respond to an electric field below a certain level but are switched between, e.g., two stable states in response to an electric field above the certain level. In the present invention, the thickness of the liquid crystal layer and the spacing between opposite electrodes in one picture element are provided with a variation or distribution, so that there result, varying field intensities in a picture element when a certain voltage pulse is applied to the picture element. As a result, there are formed regions where switching has occurred and regions where switching has not occurred in the picture element due to the varying field intensities, whereby the gradation can be controlled according to the proportion of the switched regions.

FIG. 1 is a sectional view showing a representative embodiment according to the present invention.

A liquid crystal device 11 for gradational display comprises a ferroelectric liquid crystal 12 having layer thicknesses $d_1$, $d_2$, $d_3$ and $d_4$ varying stepwise. Corresponding to the variation in the liquid crystal layer thickness, the spacing between oppositely spaced transparent electrodes 13a (step electrode) and 13b (flat electrode) changes stepwise. In order to provide the above-mentioned changing layer thickness and spacing between the opposite electrodes, an insulating film 15 is disposed so as to form a step on a substrate 14a such as a glass plate or a plastic film. On the transparent electrodes 13a and 13b may be formed orientation control films 16a and 16b, respectively, having a wall effect of aligning smectic molecule layers of the ferroelectric liquid crystal 12 preferentially in one direction.

As described above, since the field intensities applied to the ferroelectric liquid crystal 12 in different thicknesses $d_1$, $d_2$, $d_3$ and $d_4$ are different at the respective thickness regions, regions where an applied field intensity exceeds a switching or inversion threshold level and regions where an applied field does not exceed the switching threshold level are formed in a picture element, depending on the layer thicknesses $d_1$–$d_4$ at the respective regions, to express a gradation, by applying pulse signals having a voltage height, a pulse duration or a pulse frequency varying depending on the required gradation.

In the present invention, it is desirable to provide an erasure step wherein a picture element is uniformly brought to its bright state or dark state prior to application of the above mentioned gradation signals, and then a switching or inversion voltage for inverting the state corresponding to a required gradation is applied to the ferroelectric liquid crystal in a controlled manner.

A preferred embodiment of the driving method according to the invention will be explained.

Figure 4:
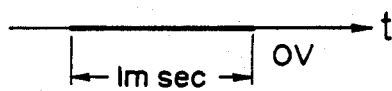
Figure 4:
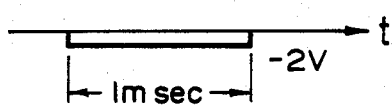
Figure 4:
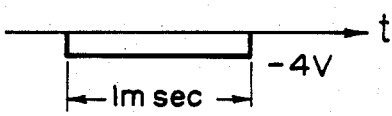
Figure 4:
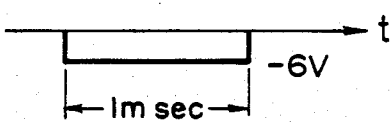
Figure 4:
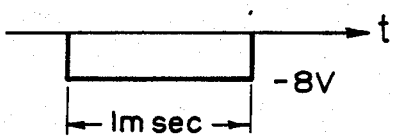

FIG. 2 is a schematic sectional view for illustrating a mode of electric signal application, and FIGS. 3 and 4 show electric signals. FIG. 3 shows a waveform of a signal (a) generated by a driving circuit 23 in FIG. 2, and FIGS. 4(a)–4(e) show waveforms of a signal (b) generated by a driving circuit 24 in FIG. 2.

A pulse of 12 V and 1 msec. is applied as a signal (a) and a pulse of −8 V and 1 msec.("erasure pulse" is applied as a signal (b) in advance in phase with the signal (a) in an erasure step. As a result, the liquid crystal is oriented to the first stable state so that the picture element A as a whole assumes a bright state (on condition that the cross nicol polarizers have been arranged to provide this state).

FIGS. 5(a)–5(e) show optical states of the picture element A when various signals as shown in FIGS. 4(a)–4(e) are applied as signals (b) to the transparent step electrode 13a in phase with the pulse as shown in FIG. 3 applied to the opposite flat electrode 13b.

Figure 5:
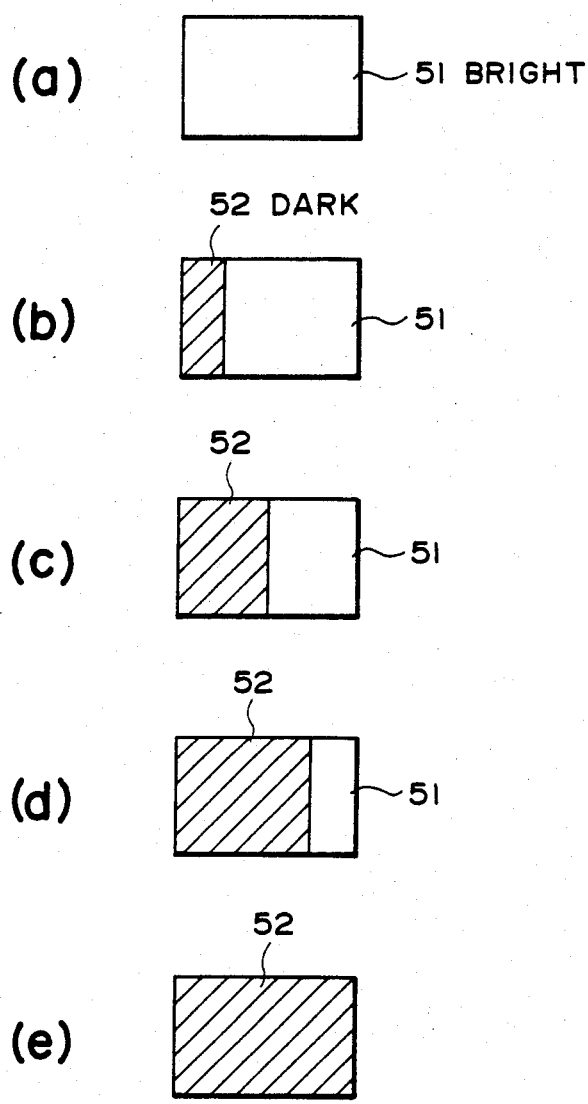
FIGS. 5(a)–(e) are schematic views for illustrating gradation display states appearing in a picture element.

The display state 51 shown in FIG. 5(a) in a state obtained when a signal (0 V pulse) shown in FIG. 4(a) is applied, and the bright state 51 obtained in the previous erasure step is retained as it is. FIGS. 5(b)–5(d) show states obtained by application of pulses shown in FIGS. 4(b)–4(d), respectively, corresponding to intermediate signals, wherein the bright state 51 is switched to a dark state 52 depending on the layer thickness $d_1$–$d_4$.

More specifically, FIG. 5(b) shows a display state wherein a region corresponding to the layer thickness $d_1$ in the picture element A has been switched to the dark state 52 by application of a pulse of −2 V and 1 msec. shown in FIG. 4(b). FIG. 5(c) shows a display state wherein regions corresponding to the layer thicknesses $d_1$ and $d_2$ in the picture element A have been switched to the dark state 52 by application of a pulse of −4 V and 1 msec. shown in FIG. 4(c). FIG. 5(d) shows a display state wherein regions corresponding to the layer thicknesses $d_1$, $d_2$ and $d_3$ in the picture element A have been switched to the dark state by application of a pulse of −6 V and 1 msec. shown in FIG. 4(d). Further, FIG. 5(d) shows a display state wherein regions corresponding to the layer thicknesses of $d_1$, $d_2$, $d_3$ and $d_4$ in the picture element A, i.e., the whole region of the picture element A, have been switched to the dark state 52 by application of a pulse of −8 V and 1 msec. shown in FIG. 4(e).

The transparent step electrode 13a and the transparent flat electrode 13b in the embodiment shown in FIG. 2 according to the present invention may respectively be formed in stripes so as to cross each other to form a matrix electrode structure.

In the driving method according to the present inventon, a gradation may also be expressed by using pulses with varying durations or frequencies. FIGS. 6(a)–6(e) show such an embodiment. Thus, the display states shown in FIGS. 5(a)–5(e) including intermediate display states may also be obtained by applying pulses having varying durations corresponding to a required gradation as shown in FIGS. 6(a)–6(e) in place of the pulses shown in FIGS. 4(a)–4(e).

In this instance, the pulses shown in FIGS. 6(a)–6(d) are signals for providing intermediate tones. Similar gradational display can be also effected by using pulse signals each comprising a varying number of pulses in a unit time.

In the embodiment of the liquid crystal device shown in FIGS. 1 and 2, only one side of the transparent electrodes are made stepwise. However, both sides of the transparent electrodes may also be made stepwise.

Figure 7:
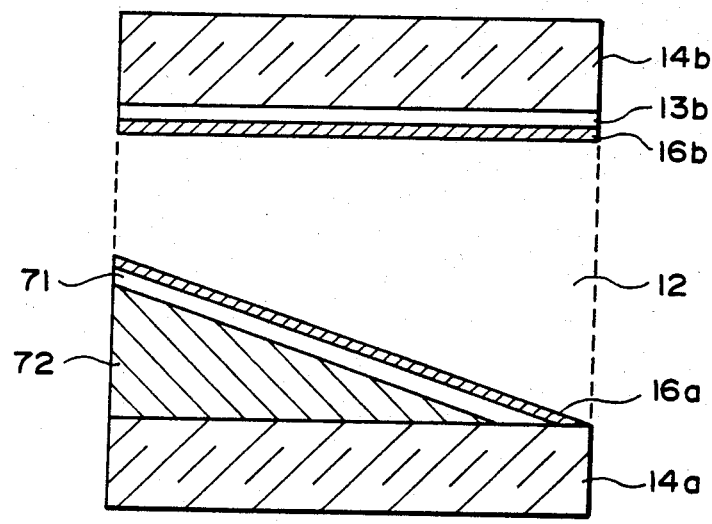
FIG. 7 is a sectional view showing another embodiment of the liquid crystal device according to the invention.

FIG. 7 is a sectional view showing another embodiment of the liquid crystal device according to the present invention. In the liquid crystal device shown in FIG. 7, the spacing between opposite electrodes and the thickness of the ferroelectric liquid crystal layer disposed therebetween are continuously or gradually changed. For this purpose, an insulating film 72 having a wedge shape, and a transparent electrode 71 is formed thereon. On the electrode 71 and the opposite electrode 13b are further formed orientation control films 16a and 16b, respectively, in the embodiment shown in FIGS. 1 and 2.

The orientation control films 16a and 16b may be films of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulosic resin, melamine resin, urea resin and acrylic resin, which have been subjected to a uniaxial orientation treatment such as rubbing.

The step-form insulating film 15 may be obtained by repeating a photolithographic technique. The insulating material may preferably be composed of a photoresist resin. However, another resin such as polyvinyl alcohol, polystyrene, cellulosic resin, polyamide or polyimide may also be used.

Figure 8:
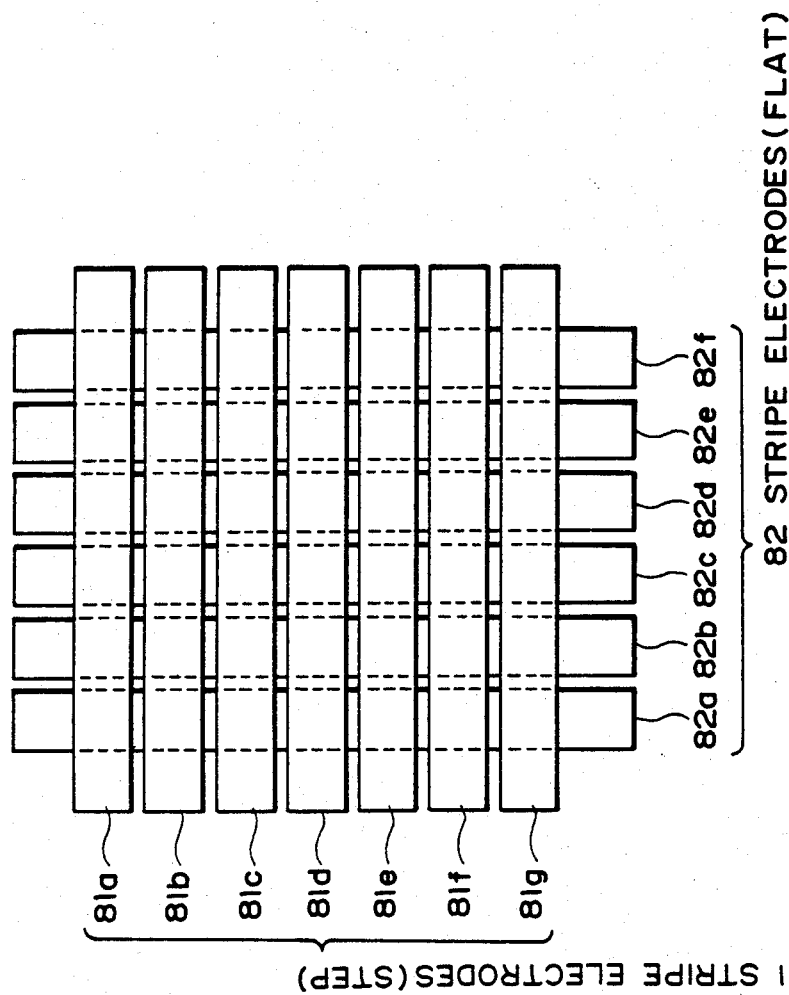
FIG. 8 is a schematic plan view showing a matrix electrode arrangement usable in the present invention.

FIG. 8 is a schematic plan view for illustrating an embodiment wherein the gradation display method according to the invention is applied to a matrix driving system.

A display panel shown in FIG. 8 comprises a plurality of transparent stripe electrodes 81 (81a, 81b, ... 81g) having a step-form section on a glass plate (not shown). Opposite the transparent step electrodes 81 are disposed transparent flat stripe electrodes 82 so as to intersect with the transparent step electrodes 81. A ferroelectric liquid crystal (not shown) is further disposed between the opposite transparent electrodes 81 and 82.

In an embodiment of the matrix driving method according to the present invention, all or a part of the picture elements formed by intersections of transparent step-form electrode stripes 81 and transparent flat electrode stripes are once brought to either a bright or a dark state, and then a writing signal including gradation signals is sequentially applied to the picture elements row by row thereby to form a gradational image. In another embodiment, all or a part of the picture elements on a row are once brought to either the bright or dark states, and then a writing signal including gradation signals are applied to the picture elements. These steps are effected sequentially and row by row to form a gradational image. Basic steps of these embodiments disclosed in, e.g., G.B. Patent Specification No. 2141279A, and U.S. patent application Ser. No. 691,761 and may be adopted also in the present invention as preferable modes.

More specifically, the driving method according to the present invention is embodied as a driving method for a liquid crystal device of the type comprising a picture element formed by a first electrode, a second electrode oppositely spaced from the first electrode so as to form a varying spacing therebetween, and a ferroelectric liquid crystal disposed at the opposite portion between the first and second electrodes and having a varying layer thickness; and driving method comprising: a first step of applying a voltage signal between the first and second electrodes for orienting a region extending over the whole area of the picture element to either one of a first or a second state and a second step of applying a pulse with a waveform corresponding to gradation information between the first and second electrodes to switch the state of a region defining a prescribed area of the picture element from one state resultant in the first step to the other state.

According to a specific embodiment, the present invention is embodied as a driving method for a liquid crystal device of the type comprising a matrix electrode structure having a plurality of scanning electrodes and a plurality of signal electrodes intersecting with the scanning electrodes, and a ferroelectric liquid crystal disposed at each intersection of the scanning and signal electrodes and having varying layer thicknesses; the driving method comprising: a first step of applying at a time an electric signal between all or a part of the scanning electrodes and all or a part of the signal electrodes so that substantially the whole area at each intersection between said all or a part of the scanning and signal electrodes is oriented to either a first or a second state, and a second step of applying a scanning selection signal to the scanning electrodes sequentially and row by row and, in phase with the scanning selection signal, applying a pulse signal with a waveform corresponding to gradation information to selected signal electrodes so that a prescribed area at each selected intersection is switched from one state resultant in the first step to the other state.

The present invention is further embodied as a driving method for a liquid crystal device of the type comprising a matrix electrode structure having a plurality of scanning electrodes and a plurality of signal electrodes intersecting with the scanning electrodes, and a ferroelectric liquid crystal disposed at each intersection of the scanning and signal electrodes and having a varying layer thickness, each pair of the scanning electrode and the signal electrode sandwiching the ferroelectric liquid crystal at each intersection having a varying spacing therebetween, the driving method comprising: a first step of sequentially applying a first scanning selection signal to the scanning electrodes and, in phase with the first scanning selection signal, applying a clearing signal to all or a prescribed part of the signal electrodes, so that substantially the whole area at each of all or a prescribed part of the intersections on the scanning electrodes is oriented to either a first or a second state, and a second step of sequentially applying a second scanning selection signal to the scanning electrodes and, in phase with the second scanning selection signal, applying a pulse signal with a waveform corresponding to gradation information to selected signal electrodes so that a prescribed area at each selected intersection is switched from one state resultant in the first step to the other state. In this case, it is preferred that the first and second scanning selection signals are applied to one scanning electrode consecutively in different phases.

Figure 6:
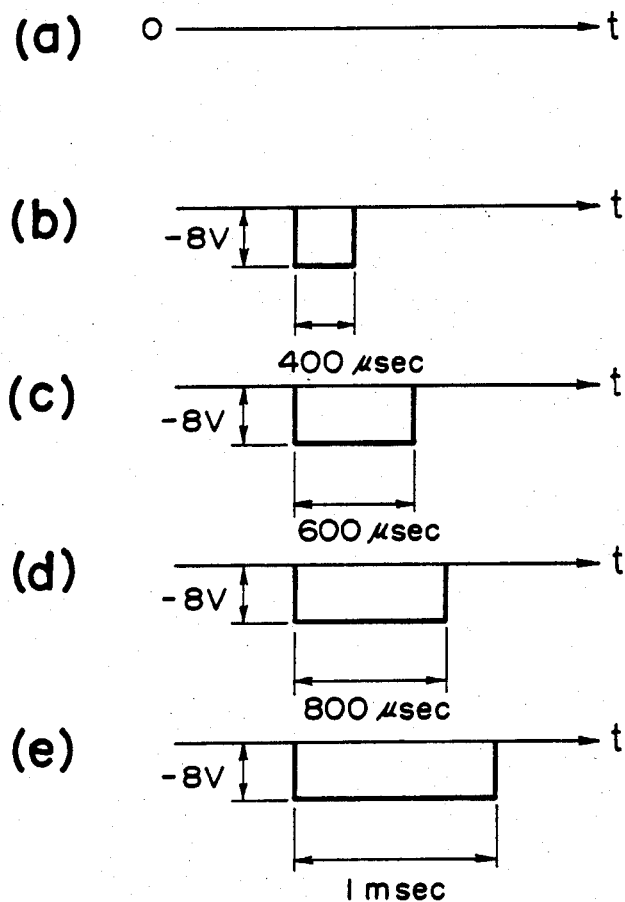
FIGS. 6(a)–(e) show gradation signals used in another embodiment.

Referring to FIG. 8, the driving method according to the present invention may be effected by using the transparent step-form electrode stripes 81 as the scanning electrodes and applying thereto scanning signals, while using the transparent flat electrode stripes 82 as the signal electrodes and applying thereto gradation signals as shown in FIGS. 4 or 6 selectively. Alternatively, it is also possible to apply the scanning signals to the transparent flat electrode stripes 82 and apply the gradation signals to the transparent step-form electrode stripes 81.

Hereinbelow, the present invention will be explained with reference to specific working examples.

EXAMPLE 1

A step-form insulating film as shown by reference numeral 15 in FIG. 1 was formed on a glass plate with an acrylic negative resist resin (trade name: "RFG" mfd. by Sekisui Fine Chemical K.K.). On the step-form insulating film was formed a film of ITO (indium-tinoxide) constituting transparent stepform electrode stripes, which were then covered with a uniformly extending 1000 Å-thick film of polyimide by applying a 5 wt. % solution in N-methylpyrrolidone of a polyamic acid which was a dehydro-condensation product of pyromellitic dianhydride and 4,4'-diaminodiphenyl ether and then causing a dehydration and ring-closure reaction by heating at 180° C. The polyimide film was then treated by rubbing along the extension direction of the electrode stripes to provide an electrode plate A.

Separately, on another glass plate were formed flat electrode stripes of an ITO film which were then covered with a 1000 Å-thick polyimide film similar to that used for the electrode plate A. The polyimide film was then treated by rubbing in a direction perpendicular to the extension of the flat electrode stripes to provide an electrode plate B.

Then, the electrode plates A and B were superposed with each other so that their extension directions crossed each other at right angles (i.e., with their rubbing directions being in parallel with each other), and their peripheral parts were sealed with an epoxy adhesive except for a part providing an injection port to prepare a blank cell. Then, the following composition placed in an isotropic phase was injected into the blank cell under vacuum and the injection part was sealed. Then, the cell was gradually cooled at a rate of 0.5° C./hour to prepare a ferroelectric liquid crystal device containing the liquid crystal in a bistable chiral smectic phase.

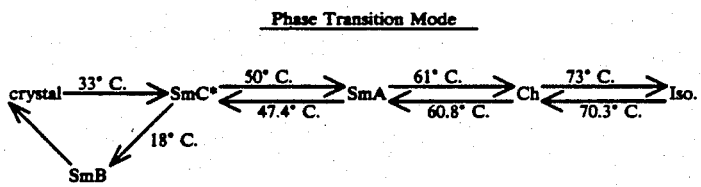

The phase transition mode of the above composition was as follows.

Phase Transition Mode crystal $\xrightarrow{33°C.}$ SmC* $\underset{47.4°C.}{\overset{50°C.}{\rightleftarrows}}$ SmA $\underset{60.8°C.}{\overset{61°C.}{\rightleftarrows}}$ Ch $\underset{70.3°C.}{\overset{73°C.}{\rightleftarrows}}$ Iso.

SmC* $\xrightarrow{18°C.}$ SmB

In the above, SmC* means a chiral smectic C phase, SmA a smectic A phase, SmB a smectic B phase, and Iso. an isotropic phase.

Figure 9:
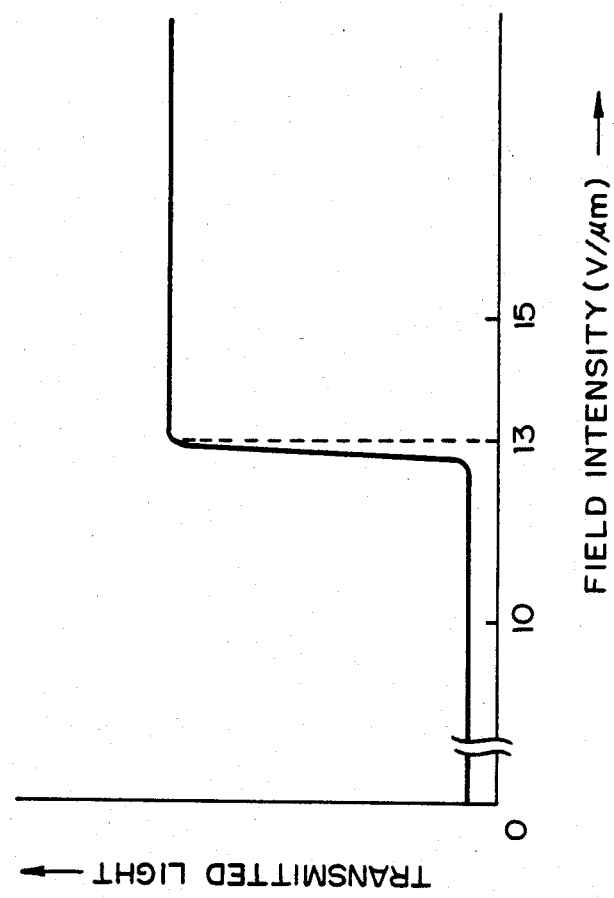
FIG. 9 is a view showing the relationship between a transmittance and an applied field intensity for a ferroelectric liquid crystal used in an example.

A field responsive characteristic of the above composition is shown in FIG. 9. The characteristic curve of FIG. 9 was obtained by measuring transmittances of a 1 μ-thick layer of the ferroelectric liquid crystal composition in the chiral smectic C phase provided with cross nicols when rectangular pulses with a pulse duration of 1 msec. were applied thereto at various field intensities. It is seen from FIG. 9 that the above composition was switched or inverted from the first stable orientation state to the second stable orientation state at a field intensity of 13 V/μm when rectangular pulses with a pulse duration of 1 msec. were applied.

With respect to the above-mentioned ferroelectric liquid crystal device, the switching field intensities were measured at various liquid crystal layer thickness, whereby the following results were obtained.

TABLE 1

| Thickness of ferroelectric liquid crystal layer | Switching field intensity |
|---|---|
| $d_1 = 0.9$ μm | 11.7 V |
| $d_2 = 1.1$ | 14.3 |
| $d_3 = 1.3$ | 16.9 |
| $d_4 = 1.5$ | 19.5 |

In the thus obtained ferroelectric liquid crystal device, a rectangular pulse of 12 V and 1 msec. was applied to all the transparent flat electrode stripes on the electrode plate B, and simultaneously therewith, a rectangular pulse of −8 V and 1 msec. was applied to all the transparent step electrode stripes on the electrode plate A, thereby to bring all the picture elements to the bright state. Then, a rectangular pulse of 12 V and 1 msec. shown in FIG. 3 was applied as a scanning selection signal to the flat electrode stripes on the electrode plate B sequentially and row by row, while a 0 volt signal was applied to the non-selected flat electrode stripes. On the other hand, to the step electrode stripes on the electrode plate B, a rectangular pulse of 0 V and 1 msec., −2 V and 1 msec., −4 V and 1 msec., −6 V and 1 msec., or −8 V and 1 msec. was selectively applied depending on a required gradation in phase with the scanning selection signal, whereby a good gradational picture was displayed.

In another embodiment according to the invention, there may be used a liquid crystal device which comprises a liquid crystal layer of a ferroelectric liquid crystal, an insulating layer and picture element electrodes in a laminated form, the insulating layer being disposed on the picture element electrodes and having thicknesses varying continuously or stepwise. A gradation may be reproduced by applying a voltage signal corresponding to the required gradation to a pair of electrodes constituting a picture element.

In this embodiment, where a liquid crystal device is constituted by disposing an insulating film to cover electrodes on one or a pair of base plates, a voltage determined by capacitance division is applied to the liquid crystal layer. For example, if the capacitance of the insulating layer(s) is denoted by $C_1$, the capacitance of the liquid crystal layer by $C_2$ and the voltage pulse height of a positive pulse by $V_0$, an initial voltage of $V_0 \cdot C_1/(C_1+C_2)$ is applied to the liquid crystal layer due to capacitance division. The voltage is then attenuated depending on a time constant $\tau = R_2(C_1+C_2)$ which is proportional with the resistance of the liquid crystal layer $R_2$ if the resistance of the insulating layer(s) is sufficiently large. If a pulse is applied for a time almost equal to the time in which a charge leaks through the liquid crystal layer, an electric field having a polarity opposite to that of the applied voltage pulse is applied to the liquid crystal layer at the time of falling of the pulse. In this instance, when the resistance $R_2$ and the capacitance $C_2$ of the liquid crystal layer are constant, the initial voltage and the time constant change depending on the capacitance $C_1$ of the insulating layer. Thus, if the insulating layer is formed on a picture element electrode in different thicknesses to provide a distribution of capacitance, a liquid crystal display can be controlled depending on the capacitance distribution by applying a voltage of varying pulse duration, height or number.

Figure 10A:
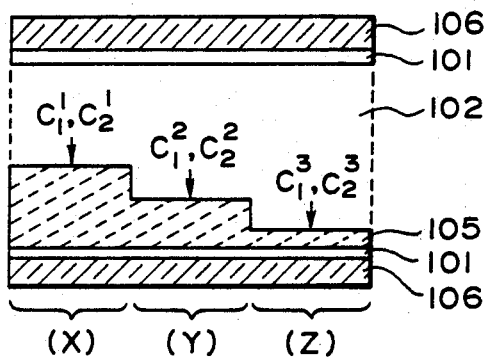
FIG. 10(A) is a sectional view showing another embodiment of the liquid crystal device according to the invention and FIG. 10(B) shows an equivalent circuit diagram thereof.

FIG. 10(A) is a sectional view of the liquid crystal display device according to this embodiment of the invention. Referring to FIG. 10(A), the liquid crystal device comprises transparent electrodes 101, a ferroelectric liquid crystal layer 102, a step-form insulating layer 105 disposed and sandwiched between a pair of glass plates 106. The transparent electrodes 101 comprises known ITO electrodes. The liquid crystal layer 102 may comprise various ferroelectric liquid crystals. The step-form insulating layer 105 may be formed of, e.g., a polyimide resin and disposed on the ITO electrodes 101 on the lower side in the figure. The liquid crystal device is depicted as divided into three picture element regions (X), (Y) and (Z). In the respective regions (X), (Y) and (Z), the step insulating layer 105 is patterned in different thicknesses so as to provide capacitances of ($C_1^1$, $C_1^2$, and $C_1^3$, respectively.

Figure 10B:
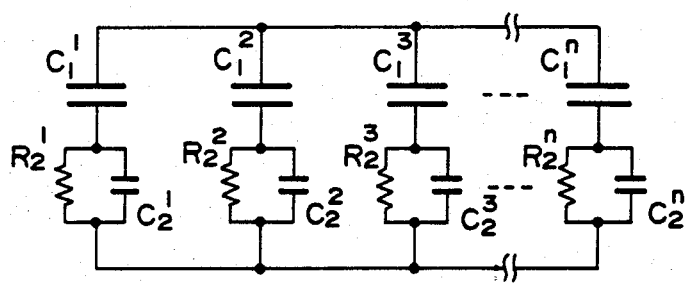

If the capacitances and resistances of the liquid crystal layer are denoted by $C_2^1$, $C_2^2$, $C_2^3$ ... and $R_2^1$, $R_2^2$, $R_2^3$ ... for the respective regions, similarly, the liquid crystal device may be represented by an equivalent circuit as shown in FIG. 10(B) wherein the number of picture element regions has been generalized as n. Herein, if all the regions are assumed to have the same area and the liquid crystal layer 102 has a sufficiently larger thickness than those of the step insulating layer 105, the following approximations result: $C_1^1 \approx C_2^2 \approx C_2^3$ and $R_2^1 \approx R_2^2 \approx R_2^3$. In this case, the voltage applied to the liquid crystal layer 102 is a function of the capacitances of the step insulating layer 105.

FIGS. 11(a)-11(f) show examples of voltage waveforms applied to one picture element and to the liquid crystal layer. More specifically, FIG. 11(a) shows an applied voltage pulse with a pulse duration T and a height $V_0$. If the pulse duration T and height $V_0$ are set appropriately, the voltage waveforms applied to the regions (Z), (Y) and (X) may be as shown in FIGS. 11(b), (c) and (d), respectively, on condition that $C_1^3 > C_1^2 > C_1^1$. Thus, the liquid crystal molecules assume the first stable state in the region (Z); the molecules once assume the first stable state and then are switched to the second stable state in the region (Y), and the molecules retain the previous state $Q_{n-1}$ before the voltage application. Further, if a pulse as shown in FIG. 11(e) ($V_1 \leq V_0$, $T_0 < T$) is applied to the region (Y), then a voltage as shown in FIG. 11(f) is applied to the liquid crystal, whereby the liquid crystal assumes the first stable state also in the region (Y).

The display states of the respective regions attained in this embodiment according to the above explained operation may be summarized in the following tables.

TABLE 2

| | (Voltage modulation) | | | | |
|---|---|---|---|---|---|
| | Voltage | | | | |
| Region | $V_1$ | $V_2$ | $V_3$ | $V_4$ | $V_5$ |
| (X) | $Q_{n-1}$ | $Q_{n-1}$ | $Q_{n-1}$ | 0 | 0 |
| (Y) | $Q_{n-1}$ | $Q_{n-1}$ | 0 | 0 | 0 |
| (Z) | $Q_{n-1}$ | 1 | 1 | 1 | 0 |

Notes:
(1) $V_1 < V_2 < V_3 < V_4 < V_5$
(2) 0, 1: display states. Voltage for orienting to the state "1" has been applied.

TABLE 3

| | (Pulse duration modulation) | | |
|---|---|---|---|
| | Pulse duration | | |
| Region | $d_1$ | $d_2$ | $d_3$ |
| (X) | $Q_{n-1}$ | $Q_{n-1}$ | $Q_{n-1}$ |
| (Y) | 0 | 0 | 1 |
| (Z) | 0 | 1 | 1 |

Notes:
(1) $d_1 < d_2 < d_3$
(2) Voltage pulse for "1" has been applied.

Tables 2 and 3 show the states attained in the respective regions. Table 2 shows the results of a voltage modulation mode wherein pulses of different voltage heights are applied. Table 3 shows the results of a pulse duration modulation mode wherein voltage pulses of different pulse durations are applied. The numerals "0" and "1" respectively denote one and the other of the bistable states. In any of the above operations, electric fields orienting the liquid crystal in the regions to the state "1". Further "$Q_{n-1}$" denotes that the previous state is retained, and if this state is taken into consideration, different states may be formed in a portion of the regions and the other regions in one picture element, whereby a display of a required gradation is achieved in the picture element.

EXAMPLE 2

A known ferroelectric liquid crystal DOBAMBC was sealed in an about 2.0 μm-gap of a liquid crystal cell. An inner face of the cell was lined with a step insulating layer of a polyimide resin having a stepwise section as shown in FIG. 10 for each picture element and subjected to a rubbing treatment. The area of one region is uniformly made 1 cm$^2$, and thicknesses of the step insulating layer 105 were made 400 Å, 800 Å and 2000 Å for the regions (X), (Y) and (Z), respectively. When a voltage pulse with an initial voltage of $V_0$ was applied, an initial voltage of 62% $V_0$, 89% $V_0$ and 94% $V_0$ were applied to the regions (X), (Y) and (Z), respectively, and their time constants were approximately 0.4, 0.8 and 1.6 msec. Then a gradation display was accomplished by applying $V_1$-$V_5$ corresponding to those shown in Table 2 above having the following values: $V_1 < 1$ volt, 1 volt $< V_2 < 5$ volts, 5 volts $< V_3 < 30$ volts, 30 volts $< V_4 < 70$ volts, and 70 volts $< V_5$.

On the other hand, according to the pulse duration modulation mode as explained with reference to Table 3, a gradation display was accomplished with the following parameters:

$d_1 < 1/2500$ sec., $1/2500$ sec. $< d_2 < 1/1250$ sec. and $1/1250$ sec. $< d_3$.

Figures 12A, 12B:
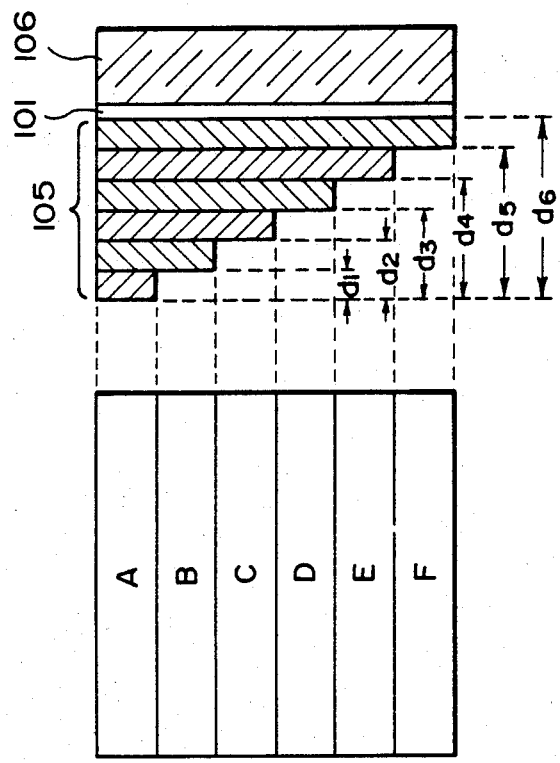
FIGS. 12(A) and (B) and FIGS. 13(A) and (B) respectively show a plan view and a sectional view illustrating an arrangement in a picture element and a corresponding sectional structure of another embodiment of the liquid crystal device according to the invention.

FIGS. 12(A) and 12(B) are a plan view and a side view of another embodiment of the liquid crystal display device according to the present invention. In the embodiment shown in FIGS. 12(A) and (B), an ITO electrode is disposed on a glass plate 106 and further covered with 6 layers of polyimide forming a step-form insulating layer 105. The respective layers of the step-form insulating layers 105 have different areas. Consequently, the regions A-F shown in the plan view, FIG. 12(A), are caused to have the thicknesses of $d_6$-$d_1$, respectively. Because $d_1 < d_2 < d_3 < d_4 < d_5 < d_6$, the relationship of $C_A < C_B < C_C < C_D < C_E < C_F$ results for the capacitances of the respective regions. More specifically, the respective capacitances may be obtained by the following formulas:

$$C_A = S(\epsilon_0 \cdot \epsilon_r)/d_6$$

$$C_B = S(\epsilon_0 \cdot \epsilon_r)/d_5$$

$$C_C = S(\epsilon_0 \cdot \epsilon_r)/d_4$$

$$C_D = S(\epsilon_0 \cdot \epsilon_r)/d_3$$

$$C_E = S(\epsilon_0 \cdot \epsilon_r)/d_2$$

$$C_F = S(\epsilon_0 \cdot \epsilon_r)/d_1$$

wherein S is a unit area of picture element, $\epsilon_0$ is the permittivity of vacuum, and $\epsilon_r$ is the dielectric constant of a material constituting the insulating layer.

FIGS. 13(A) and 13(B) are another embodiment of a picture element structure of the liquid crystal device according to the present invention. In this embodiment, the regions A, B and C constituting one picture element are given different areas of A:B:C = 3:2:1 and are provided with different thicknesses of $d_3$, $d_2$ and $d_1$ ($d_1 < d_2 < d_3$), respectively.

In the above, the present invention has been explained with reference to embodiments wherein the insulating layer has thicknesses changing stepwise, but the present invention may also be practiced without difficulty by using an insulating layer having continuously changing thicknesses.

As described hereinabove, according to the present invention, there is provided a liquid crystal device accomplishing a gradational display which has been considered difficult to accomplish by a liquid crystal device showing bistability.

What is claimed is:

1. A liquid crystal device, comprising: a pair of oppositely spaced electrodes and a ferroelectric liquid crystal layer disposed between the pair of oppositely spaced electrodes, said ferroelectric liquid crystal layer having a varying thickness.

2. The liquid crystal device according to claim 1, wherein said pair of oppositely spaced electrodes comprise a plurality of scanning electrodes and a plurality of signal electrodes intersecting with the scanning electrodes, the ferroelectric liquid crystal layer disposed at each intersection of the scanning electrodes and the signal electrodes having a varying layer thickness.

3. The liquid crystal device according to claim 1, wherein said ferroelectric liquid crystal layer thickness varies continuously or stepwise.

4. The liquid crystal device according to claim 1, wherein said ferroelectric liquid crystal is a chiral smectic liquid crystal having at least two stable orientation states.

5. The liquid crystal device according to claim 1, wherein said ferroelectric liquid crystal is a bistable chiral smectic liquid crystal.

6. The liquid crystal device according to claim 1, wherein said ferroelectric liquid crystal is a chiral smectic liquid crystal having a non-helical structure.

7. A driving method for a liquid crystal device of the type comprising a picture element formed by a first electrode, a second electrode oppositely spaced from the first electrode, and a ferroelectric liquid crystal disposed at the space between the first and second electrodes and having a varying layer thickness; said driving method comprising:
a first step of applying a voltage signal between the first and second electrodes for orienting a region extending over the whole area of the picture element to either one of a first and a second state and,
a second step of applying a pulse with a waveform corresponding to gradation information between the first and second electrodes to switch the state of a region defining a prescribed area of the picture element from one state resultant in the first step to the other state.

8. A driving method for a liquid crystal device of the type comprising a matrix electrode structure having a plurality of scanning electrodes and a plurality of signal electrodes intersecting with the scanning electrodes, and a ferroelectric liquid crystal disposed at each intersection of the scanning and signal electrodes and having a varying layer thickness; said driving method comprising:
a first step of applying at a time an electric signal between all or a part of the scanning electrodes and all or a part of the signal electrodes so that substantially the whole area at each intersection between said all or a part of the scanning and signal electrodes is oriented to either one of a first and a second state, and
a second step of applying a scanning selection signal to the scanning electrodes sequentially and row by row and, in phase with the scanning selection signal, applying a pulse signal with a waveform corresponding to gradation information to selected signal electrodes so that a prescribed area at each selected intersection is switched from one state resultant in the first step to the other state.

9. The driving method according to claim 8, wherein said pulse signal with a waveform corresponding to gradation information is a signal having a voltage height varying depending on the gradation information.

10. The driving method according to claim 8, wherein said pulse signal with a waveform corresponding to gradation information is a signal having a pulse duration varying depending on the gradation information.

11. The driving method according to claim 8, wherein said pulse signal with a waveform corresponding to gradation information is a signal having a number of pulses varying depending on the gradation information.

12. The driving method according to claim 8, wherein the ferroelectric liquid crystal has a layer thickness varying continuously or stepwise.

13. A driving method for a liquid crystal device of the type comprising a matrix electrode structure having a plurality of scanning electrodes and a plurality of signal electrodes intersecting with the scanning electrodes, and a ferroelectric liquid crystal disposed at each intersection of the scanning and signal electrodes and having a varying layer thickness; said driving method comprising:
- a first step of sequentially applying a first scanning selection signal to the scanning electrodes and, in phase with the first scanning selection signal, applying a clearing signal to all or a prescribed part of the signal electrodes, so that substantially the whole area at each of all or a prescribed part of the intersections on the scanning electrodes is oriented to either one of a first and a second state, and
- a second step of sequentially applying a second scanning selection signal to the scanning electrodes and, in phase with the second scanning selection signal, applying a pulse signal with a waveform corresponding to gradation information to selected signal electrodes so that a prescribed area at each selected intersection is switched from one state resultant in the first step to the other state.

14. The driving method according to claim 13, wherein said first and second scanning selection signals are applied to one scanning electrode consecutively in different phases.

15. The driving method according to claim 13, wherein said pulse signal with a waveform corresponding to gradation information is a signal having a voltage height varying depending on the gradation information.

16. The driving method according to claim 13, wherein said pulse signal with a waveform corresponding to gradation information is a signal having a pulse duration varying depending on the gradation information.

17. The driving method according to claim 13, wherein said pulse signal with a waveform corresponding to gradation information is a signal having a number of pulses varying depending on the gradation information.

18. A liquid crystal device, comprising: a pair of oppositely spaced electrodes and a ferroelectric liquid crystal layer disposed between the pair of oppositely spaced electrodes; said ferroelectric liquid crystal layer having a varying thickness, said pair of oppositely spaced electrodes having a varying spacing therebetween.

19. The liquid crystal device according to claim 18, wherein said pair of oppositely spaced electrodes comprises a plurality of scanning electrodes and a plurality of signal electrodes intersecting with the scanning electrodes, the ferroelectric liquid crystal disposed at each intersection of the scanning electrodes and the signal electrodes has a varying layer thickness, and each pair of the scanning electrode and signal electrode sandwiching the ferroelectric liquid crystal at each intersection have a varying spacing therebetween.

20. The liquid crystal device according to claim 18, wherein both the thickness of the ferroelectric liquid crystal and the spacing between the oppositely spaced electrodes vary continuously or stepwise.

21. The liquid crystal device according to claim 18, wherein said ferroelectric liquid crystal is a chiral smectic liquid crystal having at least two stable orientation states.

22. The liquid crystal device according to claim 18, wherein said ferroelectric liquid crystal is a bistable chiral smectic liquid crystal.

23. The liquid crystal device according to claim 18, wherein said ferroelectric liquid crystal is a chiral smectic liquid crystal having a non-helical structure.

24. A driving method for a liquid crystal device of the type comprising a picture element formed by a first electrode, a second electrode oppositely spaced from the first electrode so as to form a varying spacing therebetween, and a ferroelectric liquid crystal disposed at the opposite portion between the first and second electrodes and having a varying layer thickness; said driving method comprising:
- a first step of applying a voltage signal between the first and second electrodes for orienting a region extending over the whole area of the picture element to either one of a first and a second state and,
- a second step of applying a pulse with a waveform corresponding to gradation information between the first and second electrodes to switch the state of a region defining a prescribed area of the picture element from one state resultant in the first step to the other state.

25. The driving method according to claim 24, wherein both the thickness of the ferroelectric liquid crystal layer and the spacing between the oppositely spaced electrodes vary continuously or stepwise.

26. A driving method for a liquid crystal device of the type comprising a matrix electrode structure having a plurality of scanning electrodes and a plurality of signal electrodes intersecting with the scanning electrodes and a ferroelectric liquid crystal disposed at each intersection of the scanning and signal electrodes and having a varying layer thickness, each pair of the scanning electrode and signal electrode sandwiching the ferroelectric liquid crystal at each intersection having a varying spacing therebetween; said driving method comprising:
- a first step of applying at a time an electric signal between all or a part of the scanning electrodes and all or a part of the signal electrodes so that substantially the whole area at each intersection between said all or a part of the scanning and signal electrodes is oriented to either one of a first and a second state, and
- a second step of applying a scanning selection signal to the scanning electrodes sequentially and row by row and, in phase with the scanning selection signal, applying a pulse signal with a waveform corresponding to gradation information to selected signal electrodes so that a prescribed area at each selected intersection is switched from one state resultant in the first step to the other state.

27. The driving method according to claim 26, wherein both the thickness of the ferroelectric liquid crystal layer and the spacing between the oppositely spaced electrodes vary continuously or stepwise.

28. The driving method according to claim 26, wherein said pulse signal with a waveform corresponding to gradation information is a signal having a voltage height varying depending on the gradation information.

29. The driving method according to claim 26, wherein said pulse signal with a waveform corresponding to gradation information is a signal having a pulse duration varying depending on the gradation information.

30. The driving method according to claim 26, wherein said pulse signal with a waveform corresponding to gradation information is a signal having a number of pulses varying depending on the gradation information.

31. A driving method for a liquid crystal device of the type comprising a matrix electrode structure having a plurality of scanning electrodes and a plurality of signal electrodes intersecting with the scanning electrodes, and a ferroelectric liquid crystal disposed at each intersection of the scanning and signal electrodes and having a varying layer thickness, each pair of the scanning electrode and the signal electrode sandwiching the ferroelectric liquid crystal at each intersection having a varying spacing therebetween; said driving method comprising:

a first step of sequentially applying a first scanning selection signal to the scanning electrodes and, in phase with the first scanning selection signal, applying a clearing signal to all or a prescribed part of the signal electrodes, so that substantially the whole area at each of all or a prescribed part of the intersections on the scanning electrodes is oriented to either one of a first and a second state, and a second step of sequentially applying a second scanning selection signal to the scanning electrodes and, in phase with the second scanning selection signal, applying a pulse signal with a waveform corresponding to gradation information to selected signal electrodes so that a prescribed area at each selected intersection is switched from one state resultant in the first state to the other state.

32. The driving method according to claim 31, wherein both the thicknesses of the ferroelectric liquid crystal layer and the spacings between the oppositely spaced electrodes vary continuously or stepwise.

33. The driving method according to claim 31, wherein said first and second scanning selection signals are applied to one scanning electrode consecutively in different phases.

34. The driving method according to claim 31, wherein said pulse signal with a waveform corresponding to gradation information is a signal having a voltage height varying depending on the gradation information.

35. The driving method according to claim 31, wherein said pulse signal with a waveform corresponding to gradation information is a signal having a pulse duration varying depending on the gradation information.

36. The driving method according to claim 31, wherein said pulse signal with a waveform corresponding to gradation information is a signal having a number of pulses varying depending on the gradation information.

37. A liquid crystal device, comprising: a first base plate, a second base plate; a pair of electrodes disposed respectively on the first and second base plates, an insulating film disposed on at least one of said pair of electrodes and having a varying thickness, and a ferroelectric liquid crystal layer disposed between the first and second base plates and having a varying thickness.

38. The liquid crystal device according to claim 37, wherein the thicknesses of both the insulating layer and the ferroelectric liquid crystal layer vary continuously or stepwise.

39. The liquid crystal device according to claim 37, wherein said ferroelectric liquid crystal is a chiral smectic liquid crystal having at least two stable orientation states.

40. The liquid crystal device according to claim 37, wherein said ferroelectric liquid crystal is a bistable chiral smectic liquid crystal.

41. The liquid crystal device according to claim 37, wherein said ferroelectric liquid crystal is a chiral smectic liquid crystal having a non-helical structure.

* * * * *

UNITED STATES PATENT AND TRADEMARK OFFICE
CERTIFICATE OF CORRECTION

PATENT NO. : 4,712,877

DATED : December 15, 1987

INVENTOR(S) : SHINJIRO OKADA, ET AL.

It is certified that error appears in the above-identified patent and that said Letters Patent is hereby corrected as shown below:

COLUMN 1

Line 27, "has" should read --has a--.
Line 29, "corresponding" should read --correspondingly--.

COLUMN 3

Line 20, "micro Second" should read --microsecond--.
Line 68, "polarizes" should read --polarizers--.
Line 68, "polariz-" should be deleted.

COLUMN 4

Line 1, "ers arranged in a cross nicol relationship," should be deleted.

COLUMN 5

Line 9, "result," should read --results--.
Line 62, "pulse"" should read --pulse")--.

COLUMN 6

Line 6, "in" (second occurrence) should read --is--.

COLUMN 7

Line 35, "stripes" should read --stripes 82--.
Line 44, "embodiments" should read --embodiments are--.

UNITED STATES PATENT AND TRADEMARK OFFICE
CERTIFICATE OF CORRECTION

PATENT NO. : 4,712,877
DATED : December 15, 1987
INVENTOR(S) : SHINJIRO OKADA, ET AL.

It is certified that error appears in the above-identified patent and that said Letters Patent is hereby corrected as shown below:

COLUMN 9

Line 1, "stepform" should read --step-form--.
Line 26, "part" should read --port--.

COLUMN 10

Line 3, "thickness," should read --thicknesses,--.

COLUMN 11

Line 27, "($C_1$ $^1$," should read --$C_1$ $^1$,--.

COLUMN 13

Line 58, after "," add --and--.
Line 60, "having" should read --has--.

Signed and Sealed this

Twenty-fourth Day of May, 1988

Attest:

DONALD J. QUIGG

Attesting Officer

Commissioner of Patents and Trademarks